US00RE38804E

(19) United States
(12) Reissued Patent
Stephenson et al.

(10) Patent Number: US RE38,804 E
(45) Date of Reissued Patent: Oct. 4, 2005

(54) AIRCRAFT PASSENGER BOARDING BRIDGE SYSTEM

(76) Inventors: Jon Stephenson, P.O. Box 788, Hammond, LA (US) 70404; Richard Telford, P.O. Box 788, Hammond, LA (US) 70404

(21) Appl. No.: 09/835,923

(22) Filed: Apr. 16, 2001

(Under 37 CFR 1.47)

Related U.S. Patent Documents

Reissue of:
(64) Patent No.: 6,122,789
Issued: Sep. 26, 2000
Appl. No.: 09/085,997
Filed: May 27, 1998

U.S. Applications:
(60) Provisional application No. 60/080,349, filed on Apr. 1, 1998.

(51) Int. Cl.[7] ..... E01D 15/00; E01D 1/00
(52) U.S. Cl. ..... 14/71.5; 14/69.5; 14/71.1
(58) Field of Search ..... 14/71.1, 71.7, 14/72.5, 71.5

(56) References Cited

U.S. PATENT DOCUMENTS

| | | | | | |
|---|---|---|---|---|---|
| 2,933,149 | A | * | 4/1960 | Lee | 182/78 |
| 3,046,908 | A | * | 7/1962 | Der Yuen | 104/20 |
| 3,060,471 | A | * | 10/1962 | Der Yuen | 14/71.5 |
| 3,110,048 | A | * | 11/1963 | Bolton | 14/71.5 |
| 3,263,253 | A | | 8/1966 | Wollard et al. | |
| 3,263,254 | A | | 8/1966 | Wollard et al. | |
| 3,315,291 | A | | 4/1967 | Wollard et al. | |
| 3,317,942 | A | | 5/1967 | Wollard et al. | |
| 3,341,875 | A | | 9/1967 | Wollard et al. | |
| 3,378,868 | A | | 4/1968 | Wollard et al. | |
| 3,404,417 | A | | 10/1968 | Wollard et al. | |
| 3,541,626 | A | * | 11/1970 | Eggert, Jr. | 135/128 |
| 3,581,331 | A | * | 6/1971 | Fisher et al. | 14/71.5 |
| 3,644,952 | A | * | 2/1972 | Hatch | 14/71.5 |
| 3,664,456 | A | | 5/1972 | Smith et al. | |
| 3,683,440 | A | * | 8/1972 | Xenakis et al. | 14/71.5 |
| 4,366,591 | A | | 1/1983 | Zimmerman | |
| 4,490,869 | A | | 1/1985 | Morin | |
| 4,559,660 | A | | 12/1985 | Lichti | |
| 4,817,223 | A | * | 4/1989 | Koch | 14/71.1 |
| 5,004,188 | A | * | 4/1991 | Donneky et al. | 244/137.2 |
| 5,184,366 | A | * | 2/1993 | Rawdon et al. | 14/71.5 |
| 5,205,697 | A | | 4/1993 | Getty et al. | |
| 5,226,204 | A | * | 7/1993 | Schoenberger et al. | 14/71.5 |
| 5,267,368 | A | * | 12/1993 | Saunders | 14/71.5 |
| 5,524,318 | A | | 6/1996 | Thomas | |
| 5,636,399 | A | * | 6/1997 | Tremblay et al. | 14/71.1 |
| 5,761,757 | A | * | 6/1998 | Mitchell et al. | 14/71.5 |
| 5,791,003 | A | | 8/1998 | Streeter et al. | |
| 5,853,150 | A | | 12/1998 | Kuchenbrod | |
| 5,950,266 | A | | 9/1999 | Streeter et al. | |
| 6,055,692 | A | | 5/2000 | Pell et al. | |

* cited by examiner

*Primary Examiner*—Thomas B. Will
*Assistant Examiner*—Raymond W Addie
(74) *Attorney, Agent, or Firm*—Roy, Kiesel, Keegan & DeNicola

(57) ABSTRACT

[A cab connected to an aircraft boarding bridge walkway apron end having a forward frame section supporting a passenger floor, the section can be moved laterally relative to the apron end, and the floor having floor panels that can be retracted or extended forward of a fixed floor panel leading edge, as well as having their side edges tilted to accommodate aircraft stairwell rail handles or to better position the frame adjacent the aircraft passenger boarding door threshold] *A cab connected to an aircraft boarding bridge walkway apron end having a forward frame section supporting a passenger floor that can be moved laterally relative to the walkway apron end, or laterally relative to the aircraft cabin door, or parallel to the longitudinal axis of the aircraft, and the floor having floor panels that can be retracted or extended forward of a fixed floor panel leading edge, as well as having their side edges tilted to accommodate aircraft stairwell rail handles or to better position the frame adjacent the aircraft passenger boarding door threshold.*

34 Claims, 13 Drawing Sheets

AIRCRAFT PASSENGER BOARDING BRIDGE SYSTEM

Matter enclosed in heavy brackets [ ] appears in the original patent but forms no part of this reissue specification; matter printed in italics indicates the additions made by reissue.

CROSS-REFERENCE TO RELATED APPLICATIONS

Priority of our U.S. Provisional Patent Application Ser. No. 60/080,349, filed Apr. 1, 1998, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to airports. More particularly, the present invention relates to an aircraft passenger boarding bridges.

2. General Background of the Invention

Aircraft passenger boarding bridges usually are usable with jets or small commuter planes, but normally a single aircraft passenger boarding bridge cannot work with both a jet and a small commuter plane. In fact, the inventors believe that currently there are no passenger boarding bridges to allow passengers to board or de-board small commuter planes directly from a passenger terminal instead, passengers must enter and exit small commuter planes via stairs on the runway.

The following U.S. patents are incorporated herein by reference:

U.S. Pat. Nos. 3,046,908; 3,110,048; 3,683,440; 4,490,869; 5,004,188; 5,184,366; 5,226,204; and 5,267,368.

BRIEF SUMMARY OF THE INVENTION

The apparatus of the present invention solves the problems confronted in the art in a simple and straightforward manner. What is provided is an aircraft passenger boarding bridge comprising a walkway having a first end and a second end, the first end for connecting to an airport building; a cab portion connected to the second end of the walkway for connecting the walkway to an airplane, the cab portion having sliding means for allowing the cab portion to slide laterally and having retractable floor members. The sliding means and the retractable floor members allow the aircraft passenger boarding bridge to be used for both commuter aircraft and jet airplanes. Preferably, there are at least two retracting floor members, one for each railing of the stairway of a commuter aircraft. Preferably, there is also a retracting floor member between the two retracting floor members for each railing, approximately the width of the space between the two railings. Optionally, a pivoting floor can be provided to maintain a level position relative to the ground.

In another embodiment, an aircraft passenger boarding bridge apparatus comprises a cab portion connectable to an aircraft passenger boarding bridge walkway for connecting the walkway to an airplane, the cab portion having sliding means for allowing the cab portion to slide laterally and having retractable floor members. Preferably, there are means for bolting the cab portion to an aircraft passenger boarding bridge walkway. Preferably, there are at least two retracting floor members, one for each railing of the stairway of a commuter aircraft. Preferably, there is also a retracting floor member between the two retracting floor members for each railing, approximately the width of the space between the two railings. Optionally, a pivoting floor can be provided to maintain a level position relative to the ground.

The present invention cleverly solves the problem of providing passenger access between an airport terminal and transporting aircraft of differing size and specifications, such as large commercial airliners, smaller commuter jets, and turbo prop aircraft currently in service with most commercial airline carriers today.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
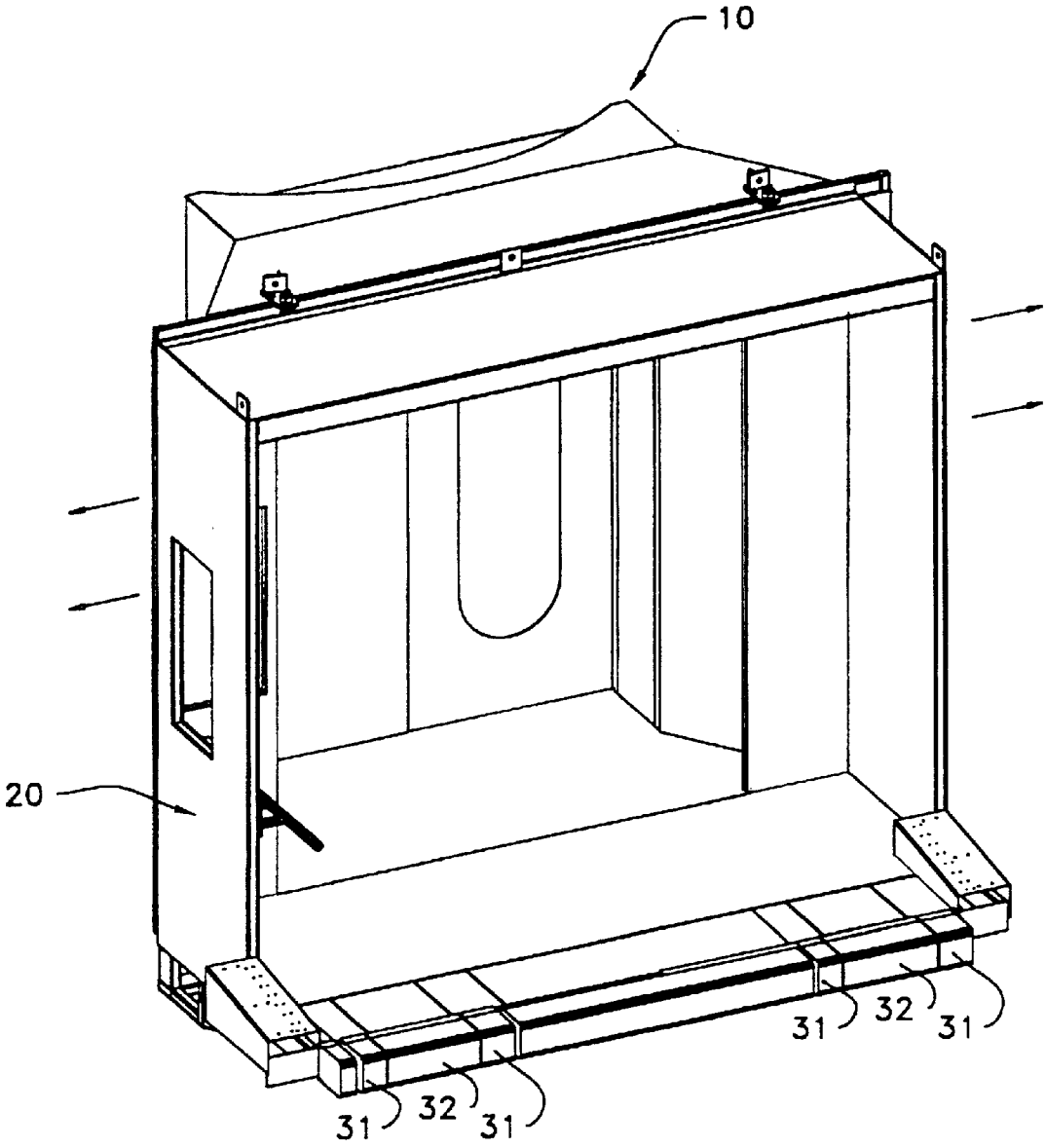
FIG. 1 is a perspective view of a first embodiment of the apparatus of the present invention.

The present invention includes an aircraft passenger boarding bridge 310 (see FIGS. 13 and 14) which includes a walkway 311 having a first end 312 and a second end 313, the first end 312 for connecting to an airport building (walkway 311 is constructed of a first section 314 and a second section 315 which telescopically slides into section 314). At the second end 313 of the walkway 311 is an apron 319. A cab portion 320 is connected to the second end 313 of the walkway 311 for connecting the walkway 311 to an airplane. There are sliding means (horizontal rollers 41 and vertical rollers 42 and associated motor means, not shown) for allowing the cab portion 320 to slide laterally relative to the apron 319. The cab portion 320 has retractable floor members 31, 32 (see FIG. 12). The sliding means and the retractable floor members 31, 32 allow the aircraft passenger boarding bridge 310 to be used for both commuter aircraft and jet airplanes (when used for large commercial jet airplanes, all retractable floor members 31, 32 would be positioned so that their ends are even with the end of the non-retractable floor portions 33, as shown in FIG. 12).

Figure 12:
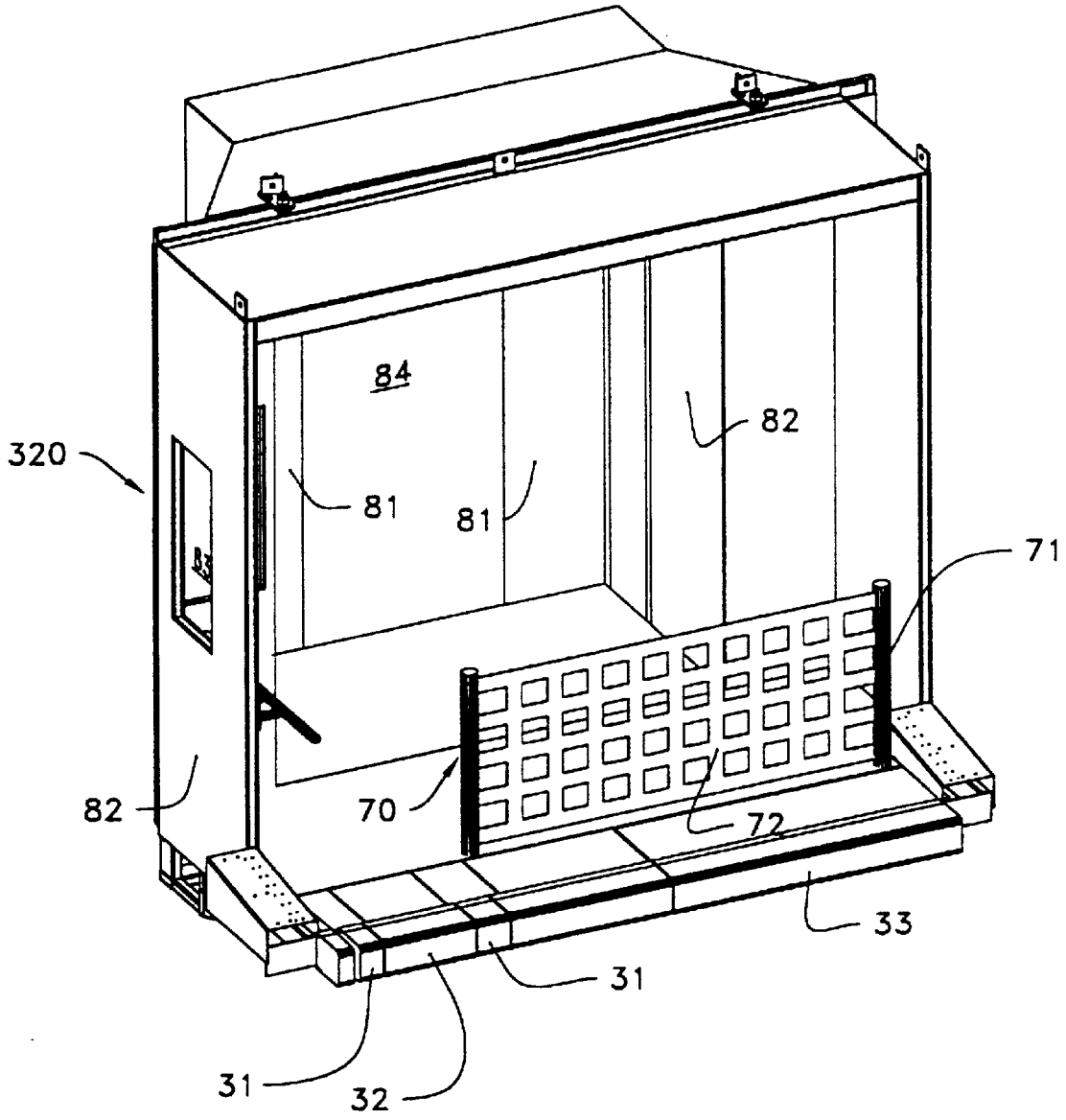
FIG. 12 is a perspective view of the present invention showing the barrier system in an open position.

In FIG. 12, there are two retracting floor members 31, one for each railing of the stairway of a commuter aircraft. There is also a retracting floor member 32 between the two retracting floor members 31 for each railing, approximately the width of the space between the two railings.

Figure 10:
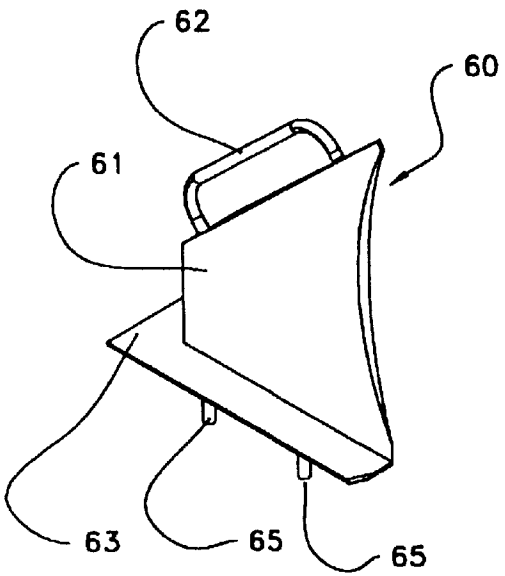
FIG. 10 is a perspective view of the hand rail safety cover of FIG. 8.
Figure 9:
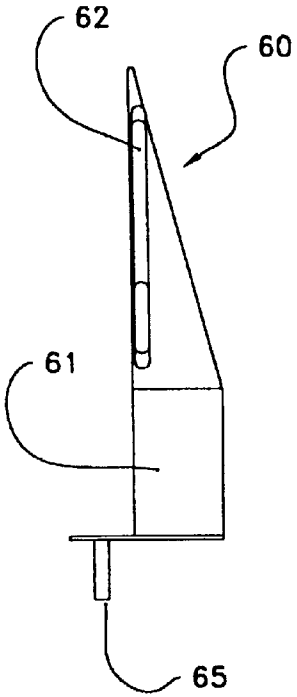
FIG. 9 is a front view of the hand rail safety cover of FIG. 8.
Figure 8:
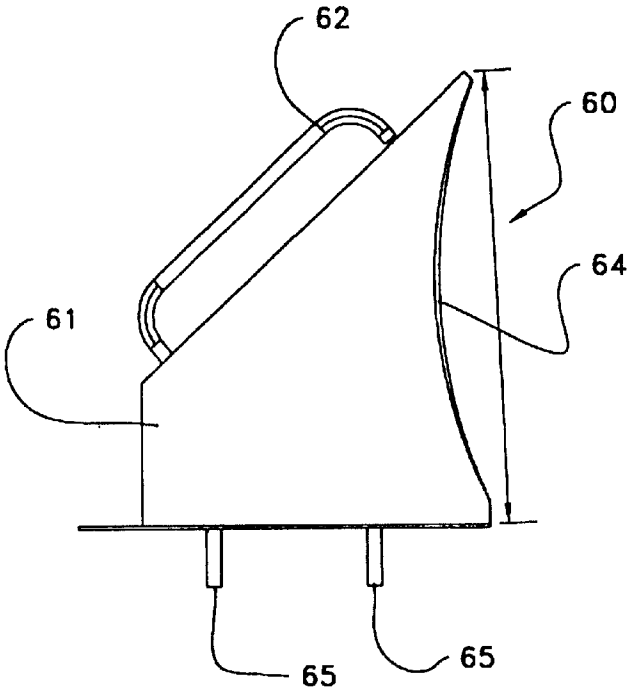
FIG. 8 is a side view of a hand rail safety cover of the present invention.

Optionally, a pivoting floor can be provided to maintain a level position relative to the ground. FIGS. 8–10 show handrail safety covers 60 to cover the floor portion where the retractable floor members 31 are retracted to allow the cab portion 320 to fit over handrails on a commuter airplane. Typically two such handrail safety covers 60 would be used. Covers 60 can be made of 0.080 inch aluminum and can have an enclosure 61 to cover a handrail 230 of an airplane, a handrail 62 to be gripped by passengers, a lip 63, a (preferably rubber) cushion 64, and mounting pins 65 which can fit in sockets in the floor of cab portion 320.

Figure 11:
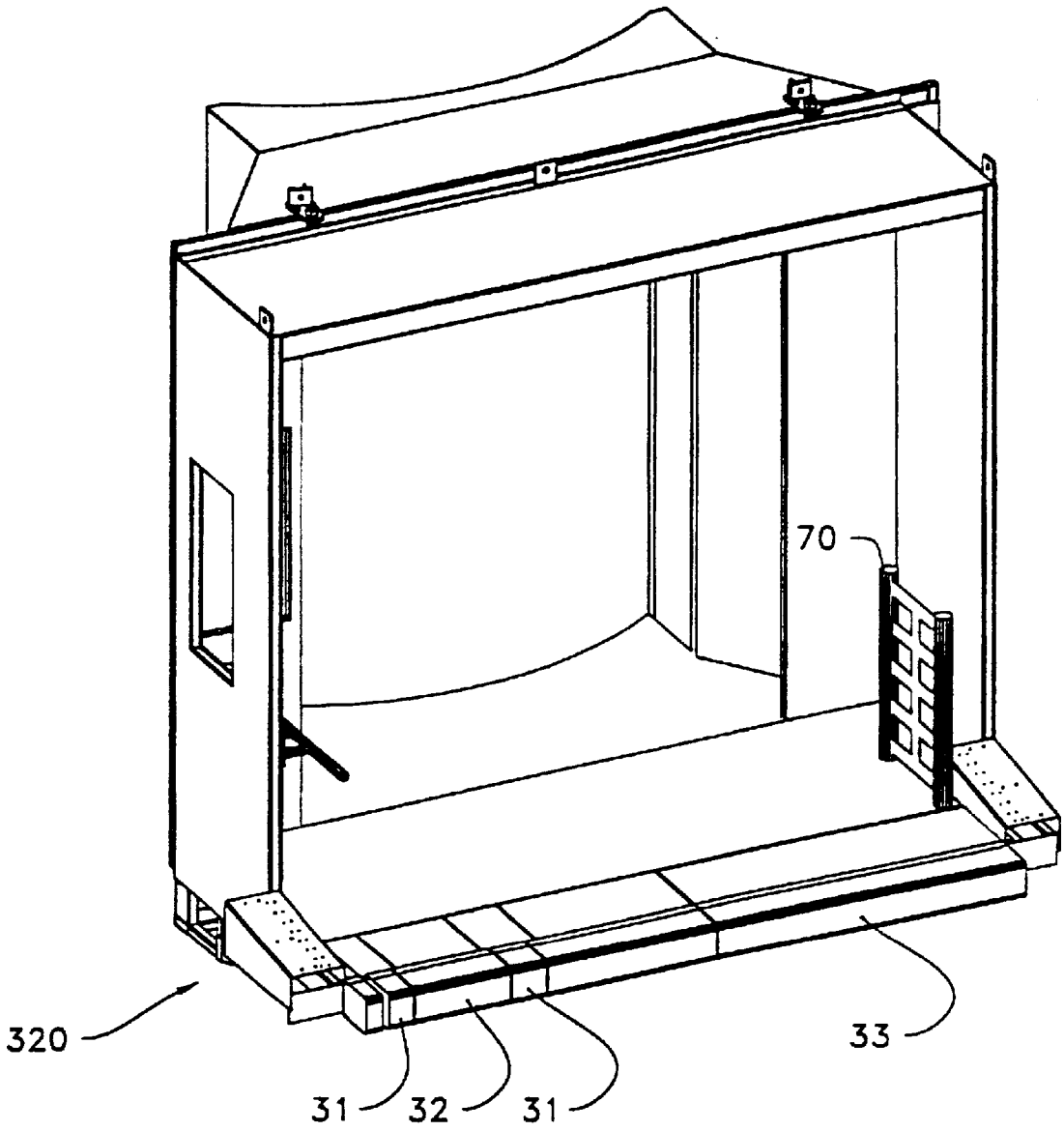
FIG. 11 is a perspective view of the present invention showing a barrier system in a stowed position.

FIGS. 11 and 12 show a safety barrier 70 to help prevent people from walking off of the cab portion 320 of the present invention and not onto an aircraft when the cab portion 320 is used with a small plane or commuter jet. Safety barrier 70 can be, for example, 48 inches high and can include a webbing 72 supported by steel poles 71.

Suitable means (such as preferably electric motors and associated controls) are provided to operate the retracting floor members of the present invention and to operate the side-shift feature of the present invention.

Figure 13:
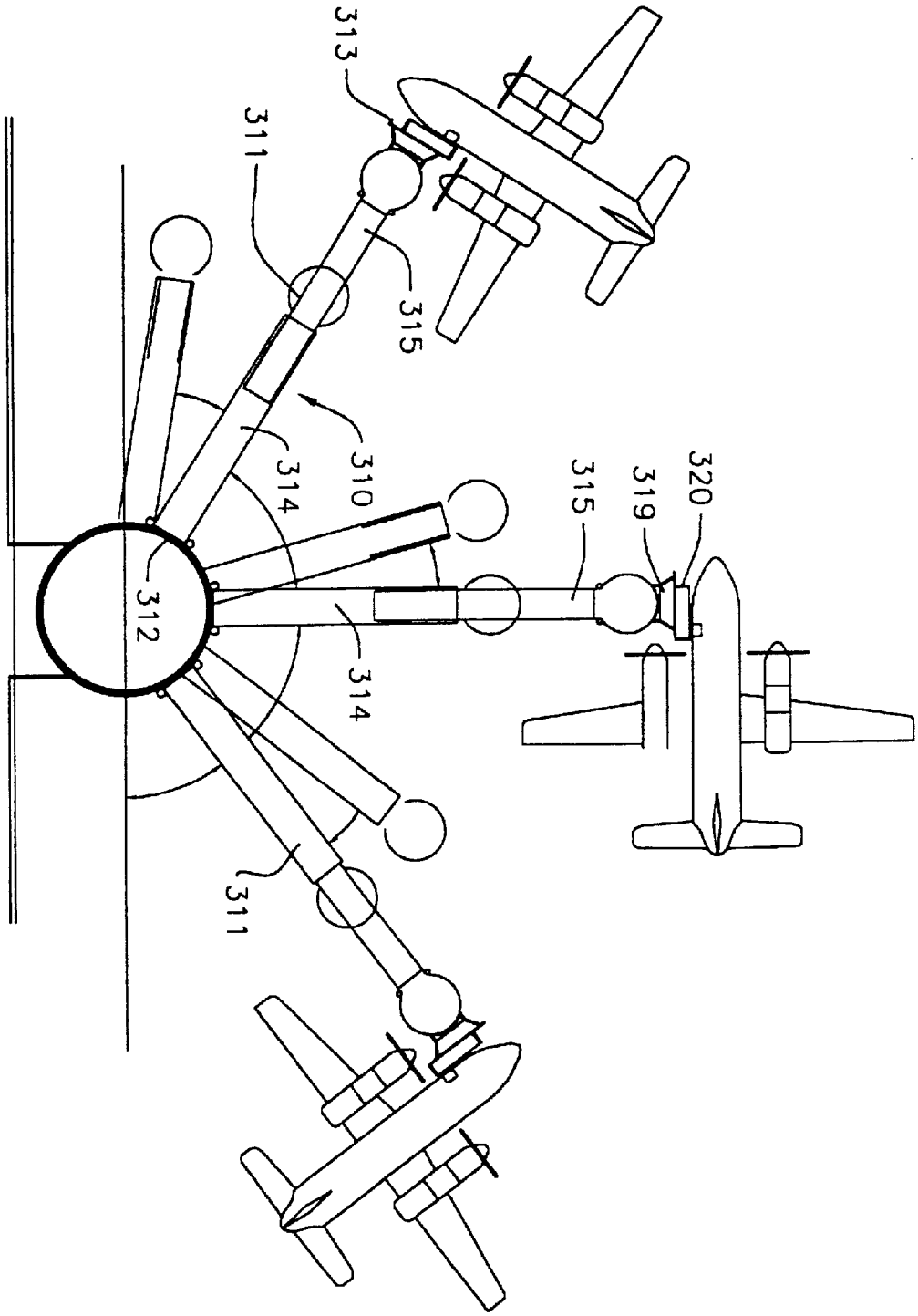
FIG. 13 is a top view of the present invention showing a single station bridge in various positions.
Figure 14:
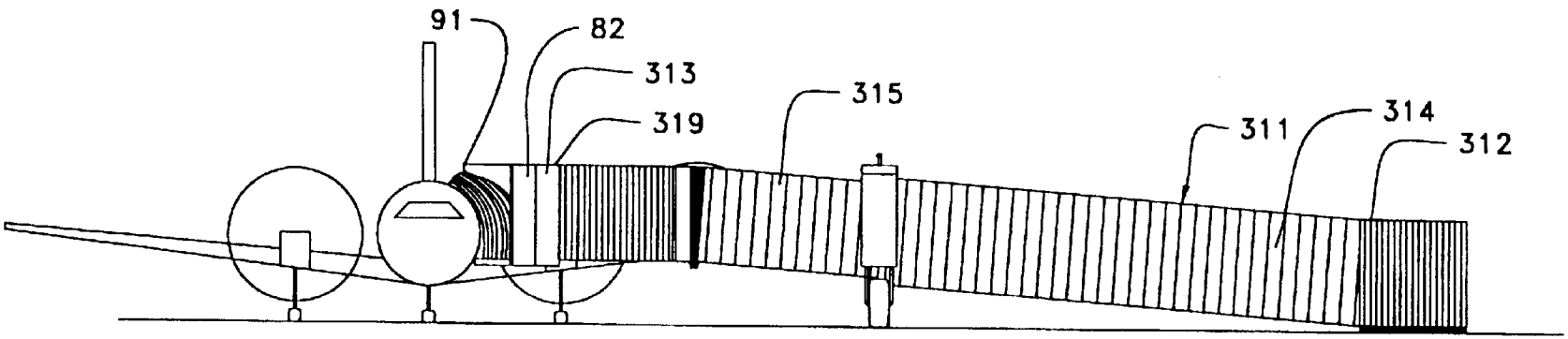
FIG. 14 is a side view of the resent invention showing the single station bridge of FIG. 13.
Figure 15:
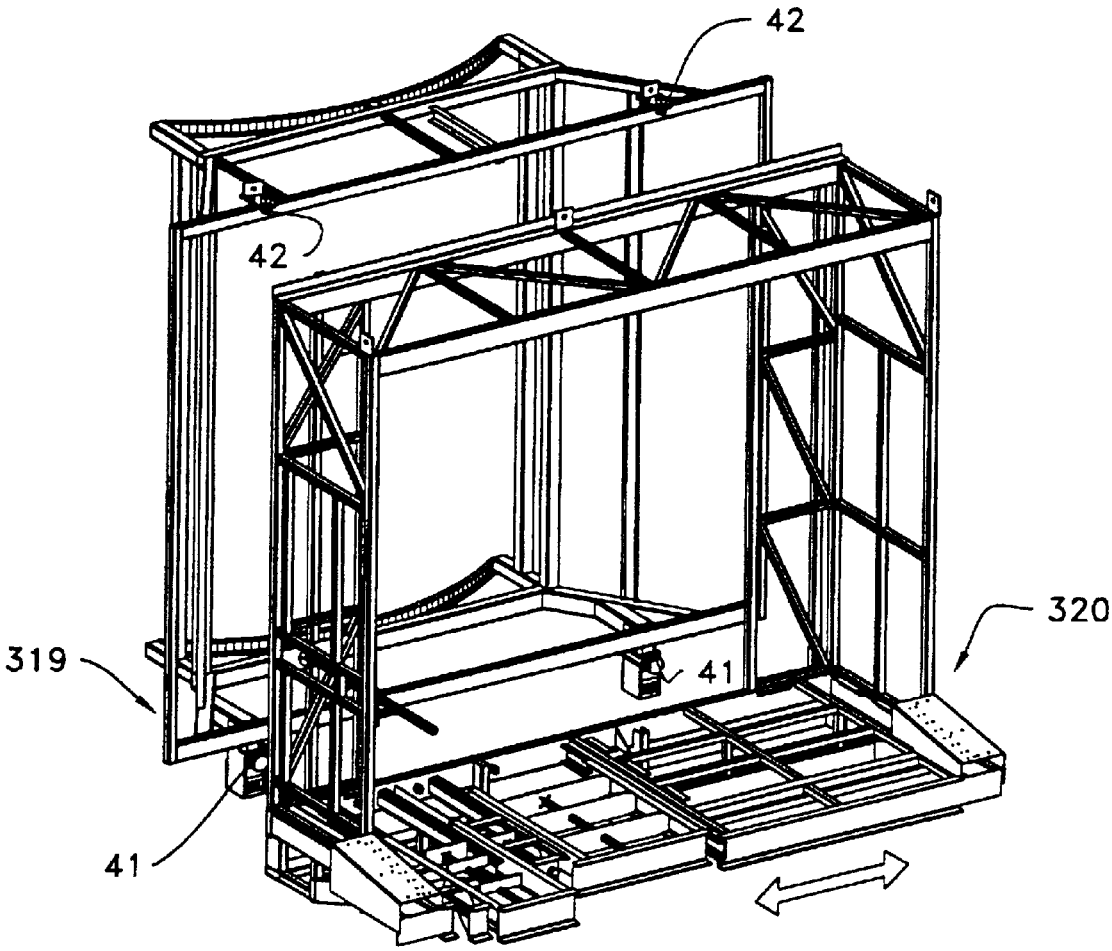
FIG. 15 shows the structural skeleton of the preferred embodiment of the present invention.

FIG. 13 illustrates well how the side-shift feature of the present invention allows the cab portion 320 of the present invention to move up to the door of an airplane with propellers without having the propellers interfere with the movement of the cab portion 320. As can be seen in FIG. 13, when the cab portion 320 is properly aligned to be used with a commuter plane, the cab portion can move parallel to the longitudinal axis of the plane and perpendicular to the longitudinal axis of the walkway 311.

Retractable floor members 31 can be, for example, about six inches wide. Retractable floor members 31 can retract, for example, about thirty inches. Retractable floor member 32 can be, for example, about eighteen inches wide. Retractable floor member 32 can be preferably move beyond the rest of the floor of cab portion 320 into the doorway of a commuter aircraft until it contacts the floor of the commuter aircraft. Retractable floor member 32 can retract so that its end is, for example, about thirteen inches inward of the end of the non-retractable portion 33 of the floor of cab portion 320, and can extend forward so that its end is beyond (forward of) the non-retractable portion 33 of the floor of cab portion 320 far enough to enter the doorway of a small commuter aircraft and contact the floor of the small commuter aircraft.

Cab portion 320 can preferably side shift about twenty inches in each direction from the center. Cab portion 320 includes two rear wall portions 81 and two side wall portions 82. There is a window 83 in one of the side wall portions 82 to allow an operator to easily view the propeller of an airplane when maneuvering the cab portion 320. The rear wall portions 81 are preferably each wider than the distance that the cab portion 320 shifts in each direction so that there will never be an open space between the outside of the apron 319 and the interior of the cab portion 320.

There is an opening 84 between rear wall portions 81 which allows passengers to pass from the apron 319 into the cab portion 320.

While not preferred, one could replace retractable floor member 32 with a stationary floor portion, though that might make it more difficult to position cab portion 320 properly and then one might need to provide some means for bridging the gap between the floor of a commuter airplane and the floor of the cab portion 320.

Cab portion 320 can be provided as part of an aircraft passenger boarding bridge 310 when the bridge 310 is built, or cab portion 320 can be added to existing aircraft passenger boarding bridges, in which case cab portion 320 can be bolted onto the existing apron of the existing bridge after the bellows and bumper are removed from the apron and rollers 41 and 42 are added to the apron.

The present invention includes a "Commuter Aircraft Adaptation Kit" or retrofit unit, for replacing old or outdated cab and bellow systems on existing passenger boarding bridges. This kit physically bolts on to an existing bridge cab face and now gives the unit the capability of servicing smaller commuter aircraft as well as larger conventional airliners.

When servicing large wide body or standard jet aircraft, the new unit herein known as the "Commuter Aircraft Adaptation Kit", would be in its normal configuration as on any standard boarding bridge.

When used with commuter turbo prop or smaller jet aircraft the unit would close in on the aircraft to close proximity then activate the retracting floor sections as to provide clearance for the aircraft's fold down door or stairs and handrails, then continue to dock up to the doorway side shifting the unit electrically until the floor or the bridge is close enough for passenger boarding or de-boarding maintaining an auto leveling activity.

The kit is also compatible on commuter bridges specifically for commuter aircraft.

The unit consists of 3 sub assemblies.

1. The first is the steel frame unit containing the mounting system rollers, electric motors, mount for the pivoting floor section and mount of the canvas and bellows unit.
2. The second section is the bellows unit for holding up the weatherproof canvas.
3. The third is the floor section with its retracting floor sections.

Figure 2:
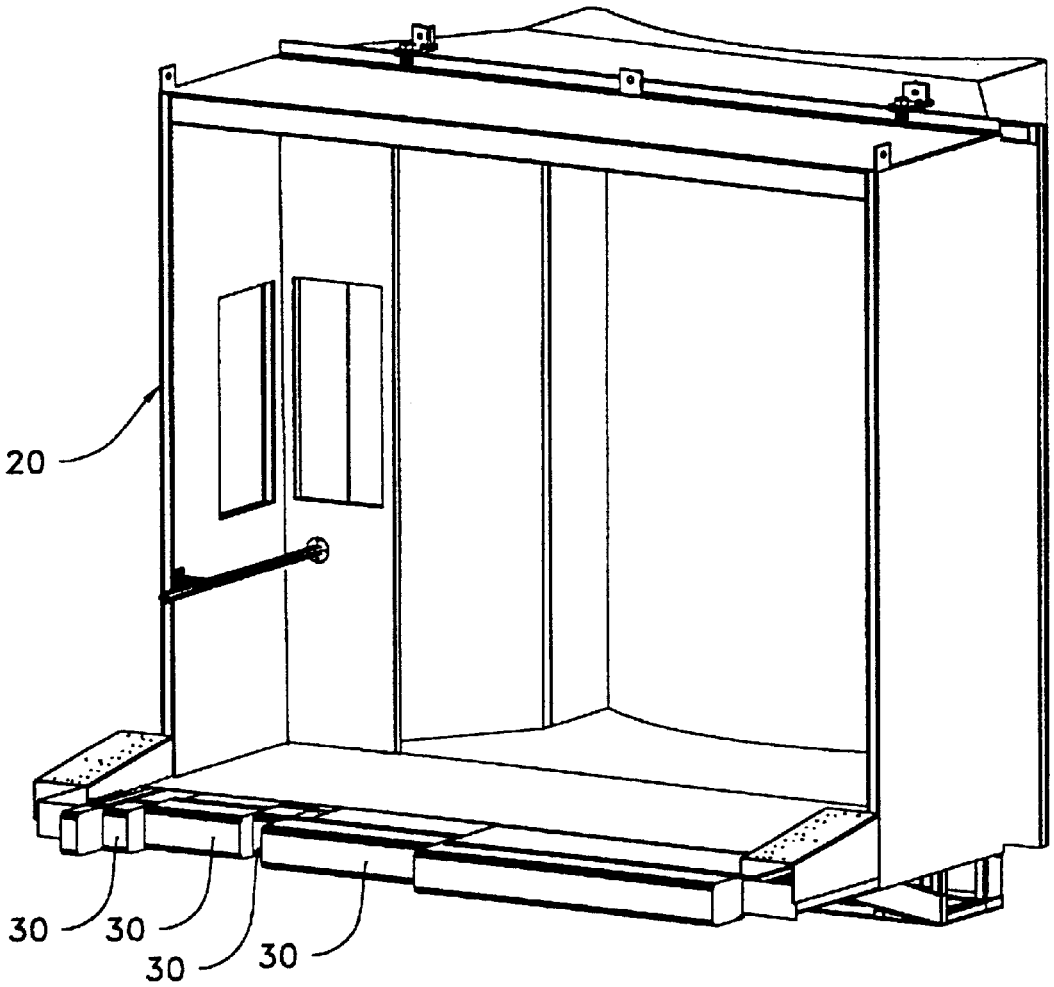
FIG. 2 is a perspective view of a second embodiment of the apparatus of the present invention.

The invention is an aircraft passenger boarding bridge which includes a cab portion which can slide laterally (see FIG. 1) and includes retractable floor members (see FIG. 2) to allow a single aircraft passenger boarding bridge to be used for both commuter aircraft and large jet airplanes. When used for a large jet airplane, the aircraft passenger boarding bridge would simply come out and meet the door opening of the large jet aircraft. When used for commuter aircraft, the cab would shift laterally to avoid the propeller of the aircraft and one or more of the retractable floor portions shown in FIG. 2 would retract to allow the cab to move up to the opening of the small commuter aircraft without having the railing of the stairs of the aircraft get in the way (the floor portion which would otherwise hit the railing would be retracted electrically).

The cab unit which slides laterally and includes the moveable floor portions (the floor portions are shown differently in FIG. 1 from in FIG. 2—either embodiment could work) could be bolted onto a standard passenger boarding bridge for large jets.

Figure 7:
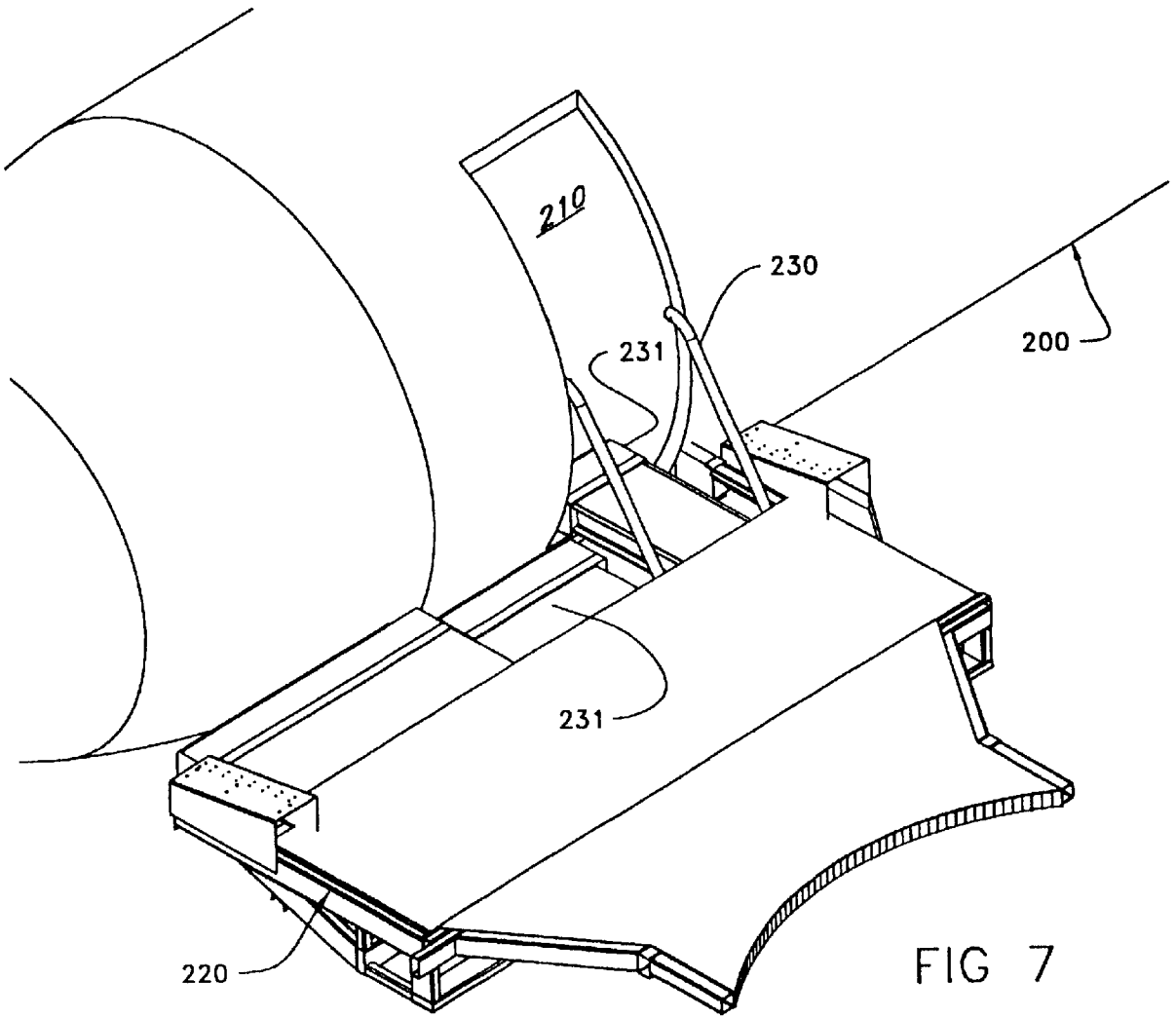
FIG. 7 is a perspective view of the second embodiment of the apparatus of the present invention.

The apparatus of the preferred embodiment of the present invention is an aircraft passenger boarding bridge 10 which includes a cab portion 20 which can slide laterally (see FIG. 1) and includes retractable floor members 30 (see FIG. 2) to allow a single aircraft passenger boarding bridge to be used for both commuter aircraft and jet airplanes. When used for a large jet airplane, the aircraft passenger boarding bridge 10 would simply come out and meet the door opening of the jet aircraft. When used for commuter aircraft 200 (see FIG. 7), the cab 20 would shift laterally to avoid the propeller of the aircraft and one or more of the retractable floor portions 30 shown in FIGS. 2 and 7 would retract to allow the cab to move up to the opening 210 of the small commuter aircraft 200 without having the railing 230 of the stairs of the aircraft get in the way (the floor portion which would otherwise hit the railing would be retracted electrically).

Figure 3:
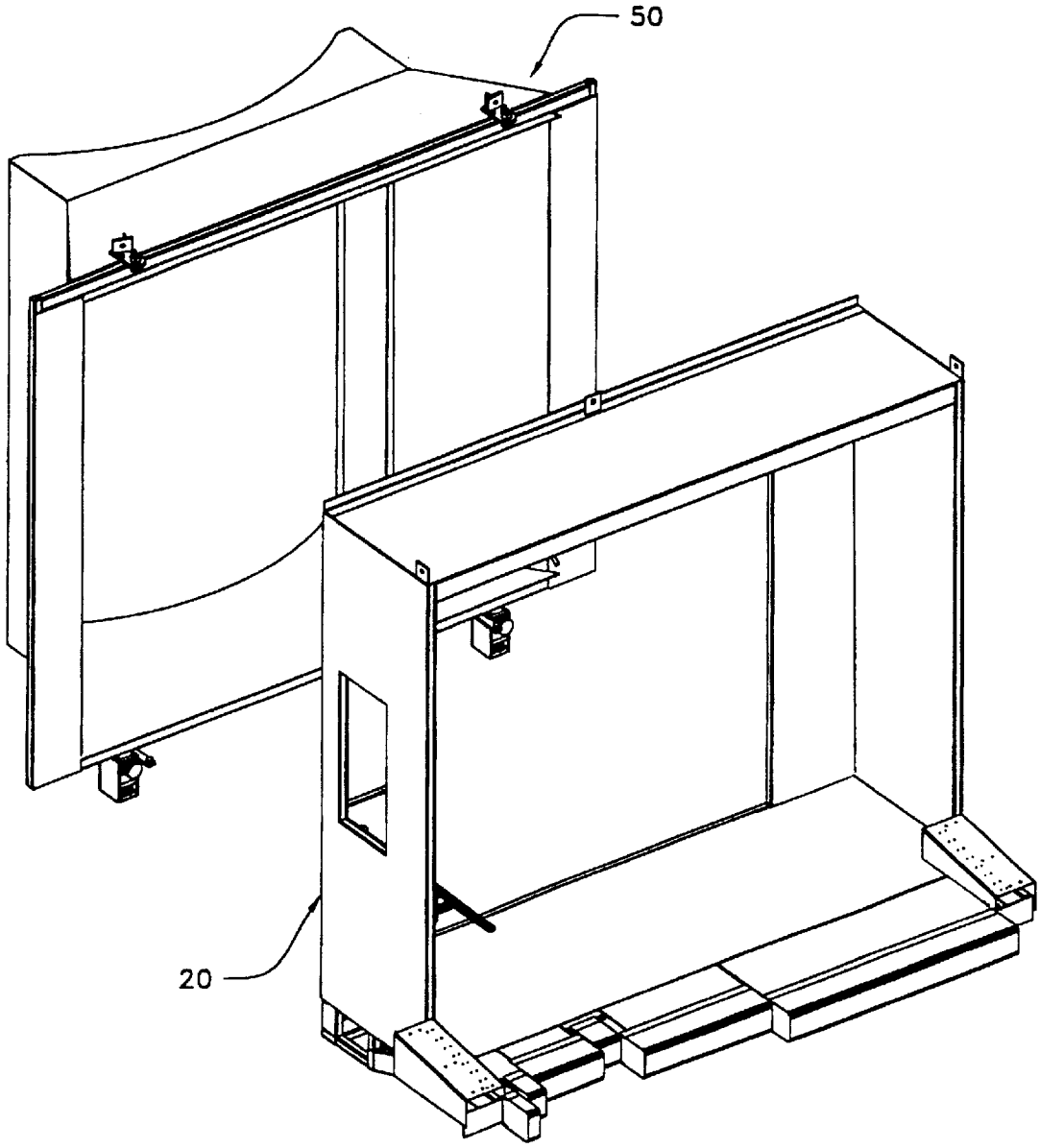
FIG. 3 is a perspective view of a first embodiment of the kit apparatus of the present invention.
Figure 4:
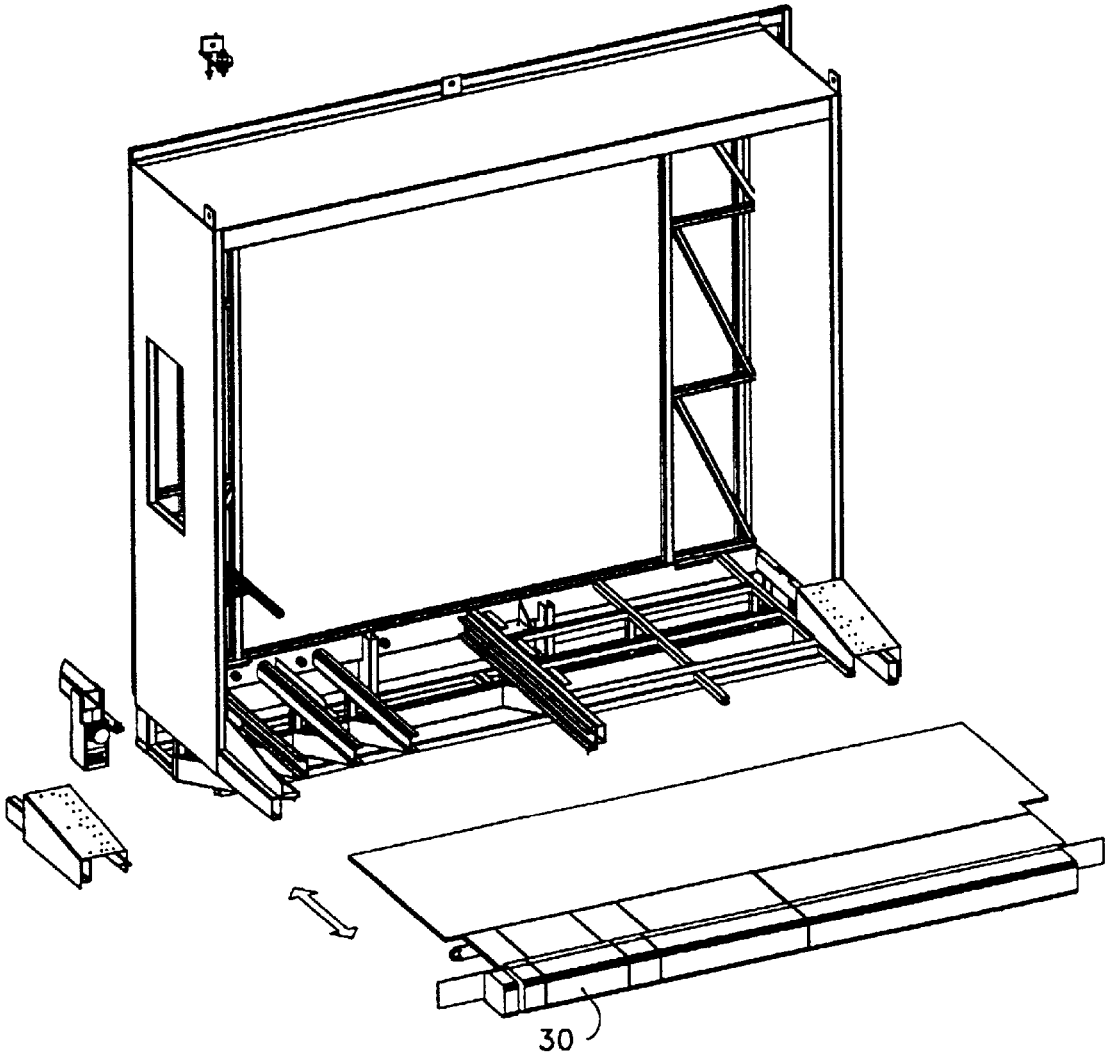
FIG. 4 is an assembly drawing of the apparatus of the present invention.
Figure 5:
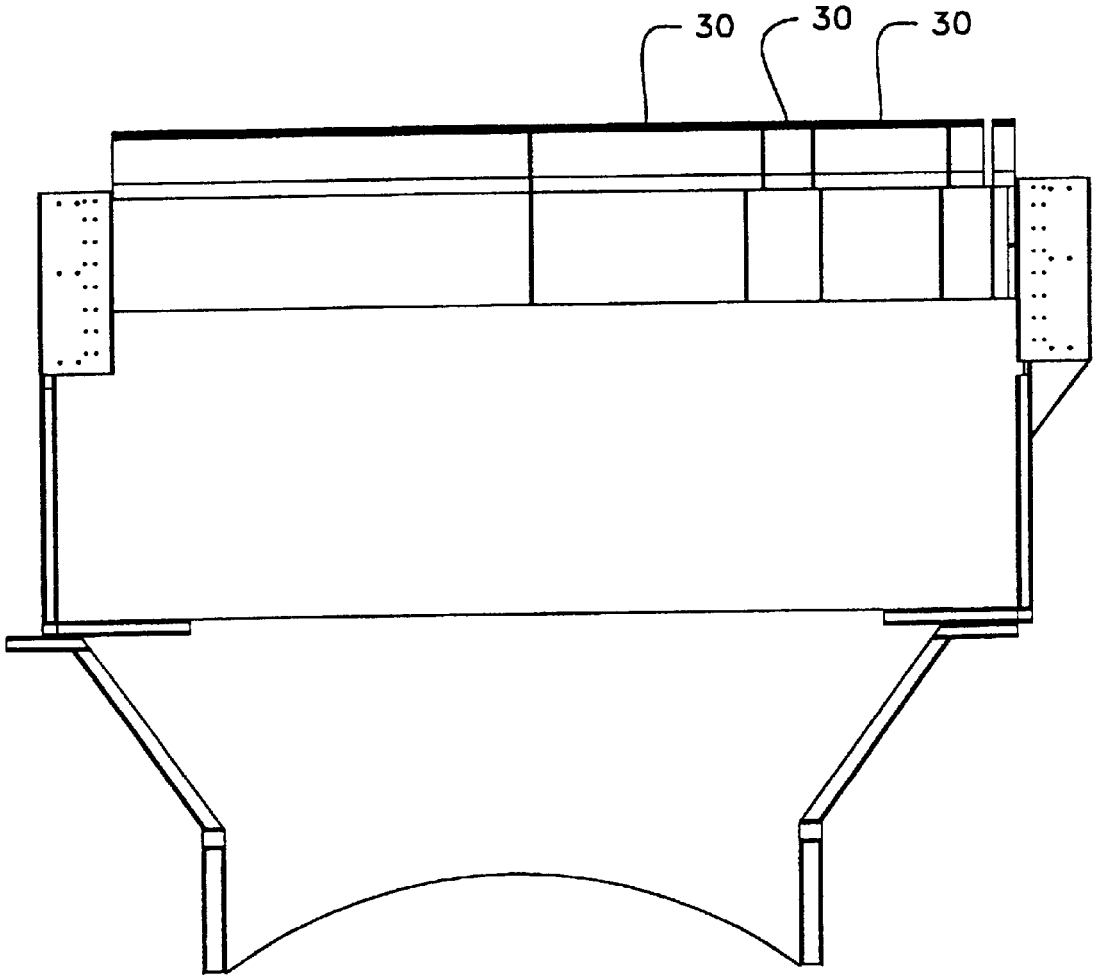
FIG. 5 is a top view of the apparatus of the present invention.
Figure 6:
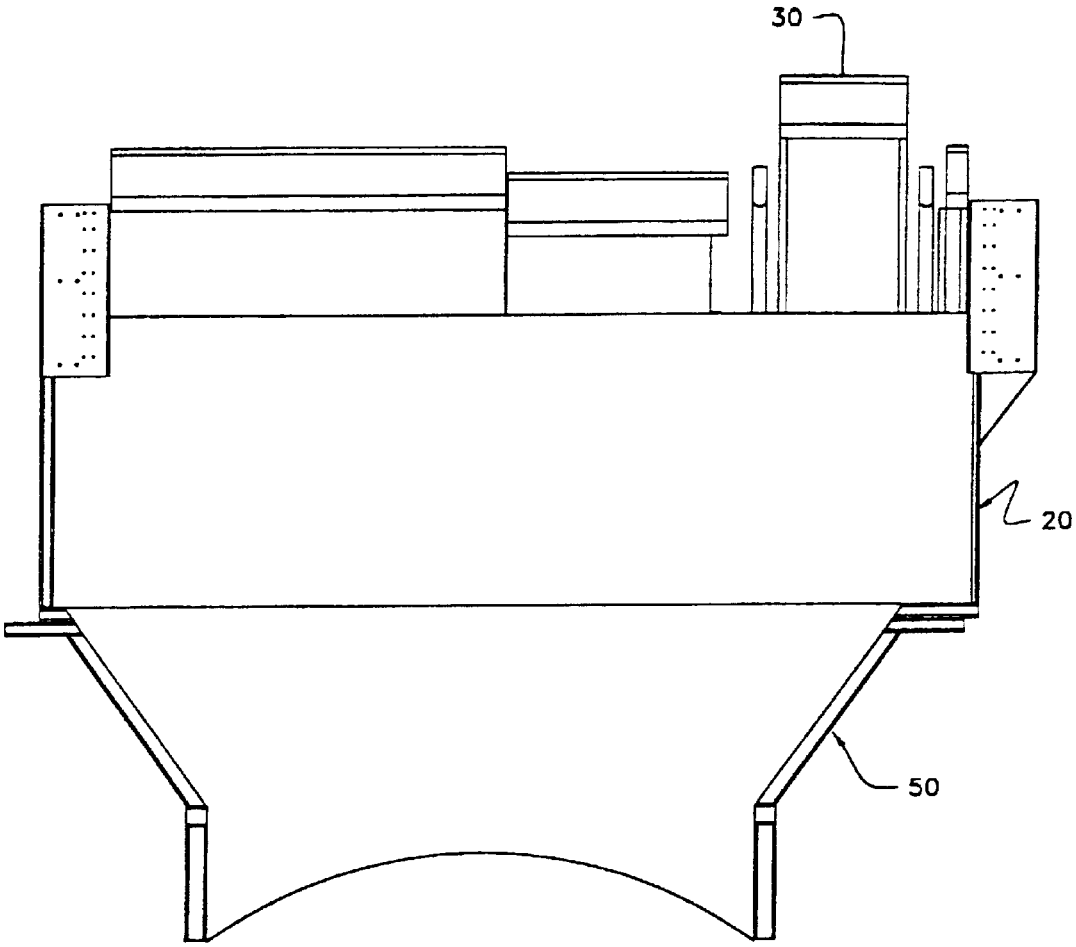
FIG. 6 is a top view of the apparatus of the present invention.

The cab unit 20 which slides laterally and includes the moveable floor portions (the floor portions are shown differently in FIG. 1 from in FIG. 2—either embodiment could work) could be bolted onto a standard aircraft passenger boarding bridge 50 for large jets (see FIG. 3).

The following is an example of how one could make an adaptation kit in accordance with the present invention.

The cab adaptation kit of the present invention can be a combination of four pieces or sub assemblies:

sub assembly one—unit frame;

sub assembly two—canopy bellows;

sub assembly three—swivel floor; and sub assembly four—retracting floor section.

The side shift can be, for example, 24". The floor sections could retract 18", and there are preferably 3 retracting sections. The floor could pivot 15 degrees.

Sub Assembly One—Unit Frame

The steel frame is the strong back and mounting structure for the other three sub assemblies. The unit frame bolts to the aircraft passenger boarding bridge cab section after all existing bellows and bumper have been removed right up to the face wall. Six bolts, for example, hold the unit frame to the aircraft passenger boarding bridge cab wall and a bottom brace also is a bolt-on unit. Power is then connected to the unit for the side shift motor, canopy motors and retracting floor sections. The frame unit measures, for example, 120"×144"×36" with two 3"×2"×⅛" steel tube extending out from the base facing forward. The frame can be made from 2"×3"×⅛" steel angle with a mounting frame of 4"×3"×¼" angle steel, rollers of the V-groove type are located at the bottom of the frame which allow lateral movement or side shifting of the entire adaptation kit. The bottom frame also holds the mount and provides a place to mount the canopy bellows as well as the swivel floor sub units. The front of frame has angle mount for installing canvas material and also holds all electrical motors for movement. The top rear frame also holds two 3" rollers for support 25" off each end. The frame mount also bolts the roof of cab.

Sub Assembly Two—Canopy Bellows

This bellows can have the same physical dimensions as a Jetway Systems standard seven bellow canopy and bellows unit consisting of a steel structure and a canvas covering with a pad cushion on the outside face. This unit also can also be mounted in a standard manner as on the Jetway Systems unit. However, the unit employed on this system is preferably of lighter gauge material and thus is easier to install.

Sub Assembly Three—Swivel Floor

This unit is the part of the system which is different from all existing commercially available passenger boarding bridges and contains the last two sub assemblies, swivel floor and retracting floor sections. Other bridge floor systems may have similar movement, however, this unit is different from all others as the floor sections move forward and aft allowing for the stairs and handrails of a smaller aircraft door to dock close enough for passenger boarding and de-boarding in a more normal manner as with standard walkways used on large aircraft. The floor section can swivel up and down at each end with the pivot point in the center location much like a child's teeter totter or bar and fulcrum with the floor section behind the pivoting section which will be hinged at two angles connecting the rear floor to the pivoting floor section without the need of a step, providing a smooth incline. Preferably electric motors provide locomotion of the floor movement. Sensors and limit switches provide protection from over-travel. The moving floor dimension is for example approximately 10'×3' rectangle using angle steel and tubing for a frame work and a two ¼" piano hinge for the aft floor assembly. The floor can preferably pivot 15 degrees up or down.

Sub Assembly Four—Retracting Floor Sections

This is the section of the kit of the present invention which gives the whole unit its unique capability to be able to operate with and service smaller commuter aircraft as well as large wide body jet aircraft at the push of a button, eliminating the need to unbolt or remove add-on equipment designed to function in a like manner as the completed self-contained unit of the present invention. Incorporated in sub assembly three, the pivoting floor, is a section of three retracting floor pieces approximately 18" in length and two measuring 6" wide and a center section of 22" wide, for example. These sections can be mounted on 1" rollers on each side and have a bar track much like a desk drawer or dishwasher loading rack. These are preferably electrically operated by motors and can retract to provide clearance for the aircraft door and handrails. These retracting sections are located at the front and right of the floor at the bumper area, as sections of the bumper travel with the floor sections during movement. Thus by providing a level floor and a side shifting cab to locate exactly on the aircraft door and handrails, then by retracting the floor sections the bridge will close in at a close proximity to the aircraft to allow passenger boarding and canopy closure.

Parts List

10 aircraft passenger boarding bridge
20 cab portion
30 retractable floor member
31 retractable floor member of cab portion 320
32 retractable floor member of cab portion 320
41 horizontal rollers
42 vertical rollers
50 standard aircraft passenger boarding bridge for large jets
60 handrail safety cover
61 enclosure of cover 60
62 handrail of cover 60
63 lip of cover 60

64 cushion (preferably rubber) of cover 60

65 mounting pins of cover 60

70 safety barrier

71 steel pole

72 safety webbing

81 rear wall portions of cab portion 320

82 side wall portions of cab portion 320

83 window

84 opening between rear wall portions 81

91 roof portion

120 cab portion

200 commuter aircraft 200

210 opening of the small commuter aircraft 200

220 cab portion

230 railing of the stairs of the small commuter aircraft 200

310 aircraft passenger boarding bridge

311 walkway of aircraft passenger boarding bridge 310

312 first end of walkway 311

313 second end of walkway 311

314 first section of walkway 311

315 second section of walkway 311

319 apron of walkway 311

320 cab portion of aircraft passenger boarding bridge 310

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

We claim:

1. A cab for serving as a portal between an aircraft passenger boarding bridge walkway and an aircraft exterior cabin door to permit passengers to board the aircraft from the walkway, the walkway having one end attached to a passenger terminal building and its opposite end extending out from the passenger terminal building, comprising:

a frame to which is attached vertical side walls, a ceiling panel and a floor to form a passageway open at opposite ends of said frame, said passageway sized to permit a person to pass there through; wherein said frame being attachable to the walkway opposite end in a manner to permit said frame to move shift laterally in either direction from the center.

2. A cab according to claim 1 wherein said frame further comprises at least one roller assembly affixed to a frame rail, said roller assembly connectable to a walkway rail positioned parallel to said frame rail, a power source operably connected to said roller assembly to cause said frame to move parallel to said walkway rail.

3. A cab according to claim 1 wherein said floor comprises:

(a) a first, second and third panel each having a leading edge positioned at one of the open ends of said passageway that will be positioned toward the aircraft, and each leading edge aligned with one another in a first operating position; said second panel being positioned intermediate said first and third panels; and (b) a power source operatively connected to said first, second and third panel to enable each panel to separately or together to be retracted to a second operating position whereby said leading edge of each of the retracted panels extends a greater distance from the aircraft than at said first operating position, said power source further operatively connected to said second panel to enable said second panel to extend to a third operating position whereby said leading edge of said second panel extends a lesser distance from the aircraft than at said first operating position.

4. A cab according to claim 3 wherein said power source is operatively connected to said second panel, and said panel is of sufficient length, to extend said second panel through said aircraft exterior cabin door when said cab is docked to the aircraft.

5. A cab according to claim 4 wherein said floor further comprises a fourth panel having a leading edge aligned with the leading edges of said first panel in said first operating position, said fourth panel being fixed in position.

6. A cab according to claim 4 wherein said power source comprises more than one separate means for providing power.

7. A cab according to claim 1 further comprising a canopy provided with a bellows type construction having one side fixed to said frame and having its opposite side extendable from said frame toward the aircraft to which said cab is to be docked, said canopy size to extend over said floor.

8. A cab for serving as a portal between an aircraft passenger boarding bridge walkway and an aircraft exterior cabin door and for aligning the walkway to the cabin door to permit passengers to board the aircraft from the walkway, comprising:

(a) a frame to which are attached vertical side walls, a ceiling panel and a floor to form a passageway open at its opposite ends, said passageway sized to permit a person to pass there through; said floor comprising a first, second and third panel each having a leading edge positioned at one of the open ends of said passageway that will be positioned toward the aircraft, and each leading edge aligned with one another in a first operating position, said second panel being positioned intermediate said first and third panels; and (b) a power source operatively connected to said first, second and third panel to enable each panel to separately or together to be retracted to a second operating position whereby said leading edge of each of the retracted panels extends a lesser distance toward the aircraft than at said first operating position, said power source further operatively connected to said second panel to enable said second panel to extend to a third operating position whereby said leading edge of said second panel extends a greater distance toward the aircraft than at said first operating position.

9. A cab according to claim 8 wherein said power source is operatively connected to said second panel, and said panel is of sufficient length, to extend said second panel through an aircraft cabin entrance when said cab is docked to the aircraft.

10. A cab according to claim 9 wherein said floor further comprises a fourth panel having a leading edge aligned with the leading edges of said first panel in said first operating position, said fourth panel being fixed in position.

11. A cab according to claim 9 wherein said power source comprises more than one separate means for providing power.

12. A cab for serving as a portal between an aircraft passenger boarding bridge walkway and an aircraft exterior cabin door to permit passengers to board the aircraft from the walkway, wherein the walkway having one end attached to a passenger terminal building and its opposite end extending out from the building, comprising a frame to which are attached vertical side walls, a ceiling panel and a floor to form a passageway open at its opposite ends, said passageway sized to permit a person to pass there through, wherein a first section of said frame forming at least in part one of said open ends of said passageway being attachable to the opposite end of the walkway permitting said frame to move side-to-side relative to the opposite end of the walkway; wherein said floor comprises a first, second and third panel each having a leading edge positioned at one of the open ends of said passageway that will be positioned toward the aircraft, and each leading edge aligned with one another in a first operating position; said second panel being positioned intermediate said first and third panels; and a power source operatively connected to said first, second and third panel to enable each panel to separately or together to be retracted to a second operating position whereby said leading edge of each of the retracted panels extends a greater distance from the aircraft than at said first operating position, said power source further operatively connected to said second panel to enable said second panel to extend to a third operating position whereby said leading edge of said second panel extends a lesser distance from the aircraft than at said first operating position.

13. A cab according to claim 12 wherein said frame further comprises at least one roller assembly affixed to a frame rail, said roller assembly connectable to a walkway rail positioned parallel to said frame rail, a power source operably connected to said roller assembly to cause said frame to move parallel to said walkway rail.

14. A cab for serving as a portal between aircraft passenger boarding bridge walkway and an aircraft to permit passengers to board the aircraft, comprising:

(a) a frame to which are attached vertical side walls, a ceiling panel and a floor to form a passageway open at its opposite ends, said passageway sized to permit a person to pass there through;

(b) a means operatively attachable to said frame to permit said frame to shift laterally in either direction from its center; and (c) a power source operatively connected to said means to cause when activated said means to move said frame laterally in relationship to said door.

15. An aircraft passenger boarding bridge comprising:

(a) a walkway having one end operatively connectable to an airport passenger terminal building to permit passengers to enter or exit said walkway, and having its opposite end extending out from said building; and (b) a cab comprising a frame to which are attached vertical side walls, a ceiling panel and a floor to form a passageway open at the opposite ends, said passageway sized to permit a person to pass there through; said cab operatively connected to said opposite end of said walkway to permit said cab to move parallel to said opposite end of said walkway; and (c) a power source containing assembly operably connected to either said frame or said walkway to cause said frame to move parallel to said opposite end of said walkway.

16. An aircraft passenger boarding bridge according to claim 15 wherein said floor comprises:

(a) a first, second and third panel each having a leading edge positioned at one of the open ends of said passageway that will be positioned toward the aircraft, and each leading edge aligned with one another in a first operating position; said second panel being positioned intermediate said first and third panels; and (b) a power source operatively connected to said first, second and third panel to enable each panel to separately or together to be retracted to a second operating position whereby said leading edge of each of the retracted panels extends a lesser distance toward the aircraft than at said first operating position, said power source further operatively connected to said second panel to enable said second panel to extend to a third operating position whereby said leading edge of said second panel extends a greater distance toward the aircraft than at said first operating position.

17. An aircraft passenger boarding bridge comprising:

(a) a walkway having one end operatively connectable to an airport passenger terminal building to permit passengers to enter or exit said walkway, and having its opposite end extending out from said building;

(b) an apron affixed to said opposite end of said walkway;

(c) a cab comprising a frame to which are attached vertical side walls, a ceiling panel and a floor to form a passageway open at its opposite ends, said passageway sized to permit a person to pass there through;

(d) a means fixed to said apron and operatively connected to said frame to cause said frame to shift laterally in either direction from the center; and (e) a power source operatively connected to said means to activate said means to cause said frame to move.

18. An aircraft passenger boarding bridge according to claim 17 wherein said means comprises at least one roller assembly fixed to said apron.

19. An aircraft passenger boarding bridge according to claim 17, wherein said floor further comprises at least one section being a movable panel operatively attached to an extending assembly to cause extension of the leading edge of said panel away from said apron and beyond the other sections of said floor a distance permitting said panel to extend through an aircraft exterior door entrance of an aircraft docked to said bridge.

20. An aircraft passenger boarding bridge according to claim 19 wherein said other sections of said floor further comprise at least one retractable panel positioned on each side of said movable panel operatively attached to a retracting assembly which when activated a second power source causes the leading edge of said retractable panel to be movable from its fully extended position toward said apron.

21. An aircraft passenger boarding bridge according to claim 20 wherein said power source and said second power source are the same.

*22. A cab attachable to a walkway apron end to facilitate passengers in boarding from the walkway apron end to an aircraft, through said aircraft's cabin door, said cab portion comprising a frame forming a passageway open at opposite ends of said frame and sized to permit a person to pass through said passageway, said frame being attachable at one of its open ends to said walkway apron end in a manner to permit said frame when aligned to be used with said aircraft to move laterally relative to said walkway apron end, laterally relative to said cabin door, or parallel to the longitudinal axis of said aircraft.*

*23. A cab according to claim 22 further comprising:*

*(a) a means operatively attachable to said frame to permit said frame to shift, and*

*(b) a power source operatively connected to said means to cause when activated said means to move said frame.*

*24. A cab according to claim 22 wherein said floor comprises at least one panel having a leading edge positioned at one of the open ends of said passageway that will*

*be positioned toward the aircraft, and a power source operatively connected to said panel to enable said panel to move to a second operating position located at a different distance from the aircraft.*

*25. A cab according to claim 24 wherein said leading edge of said panel moves outward from said floor and toward the aircraft.*

*26. A cab according to claim 24 wherein said leading edge of said panel moves inward and away from the aircraft.*

*27. An aircraft passenger boarding bridge to facilitate passengers boarding an aircraft through the aircraft cabin door, which comprises:*

*(a) a walkway having one end operatively connectable to an airport passenger terminal building to permit passengers to enter or exit said walkway, and having its opposite end extending out from said building;*

*(b) an apron affixed to said opposite end of said walkway;*

*(c) a cab comprising a frame to which are attached at least one vertical side wall and a floor to form a passageway open at its opposite ends, said passageway sized to permit a person to pass there through;*

*(d) a means fixed to said apron and operatively connected to cause said frame when aligned to be used with said aircraft's cabin door to move laterally relative to said walkway apron end, laterally relative to said cabin door, or parallel to the longitudinal axis of said aircraft; and*

*(e) a power source operatively connected to said means to activate said means to cause said frame to move.*

*28. A cab attachable to a walkway apron end to facilitate passengers in boarding from the walkway apron end to an aircraft, through said aircraft's cabin door, said cab portion comprising a frame having a floor forming a passageway open at opposite ends of said frame and sized to permit a person to pass through said passageway, said frame being attachable at one of its open ends to said walkway apron end in a manner to permit said frame when aligned to be used with said aircraft to move laterally relative to said walkway apron end, laterally relative to said cabin door, or parallel to the longitudinal axis of said aircraft, said floor having a perimeter formed by two side edges, a rear edge and a leading edge, and a power source operatively connected to said frame to enable at least one of said two side edges to be laterally tilted up or down.*

*29. A cab according to claim 28 wherein said power source is operatively connected to said frame to enable both of said two side edges to be tilted up or down.*

*30. A cab for serving as a portal between an aircraft passenger boarding bridge walkway and an aircraft exterior cabin door and for aligning the walkway to the cabin door to permit passengers to board the aircraft from the walkway comprising:*

*(a) a frame having a floor to form a passageway open at its opposite ends, said passageway sized to permit a person to pass there through; said floor comprising a first, second and third panel each having a leading edge positionable toward the aircraft, and each leading edge aligned with one another in a first operating position, said second panel being positioned intermediate said first and third panels; and*

*(b) a power source operatively connected to at least one of said first, second and third panel to enable each of the connected panels to separately or together be retracted to a second operating position whereby said leading edge of each of the retracted panels extends a lesser distance toward the aircraft than at said first operating position, said power source further operatively connected to said second panel to enable said second panel to extend to a third operating position whereby said leading edge of said second panel extends a greater distance toward an aircraft than at said first operating position.*

*31. A cab for serving as a portal between an aircraft passenger boarding bridge walkway and an aircraft exterior cabin door and for aligning the walkway to the cabin door to permit passengers to board the aircraft from the walkway, comprising:*

*(a) a frame having a floor to form a passageway open at its opposite ends, said passageway sized to permit a person to pass there through; said floor comprising a first, second and third panel each having a leading edge positionable toward the aircraft, and each leading edge having a first operating position; and*

*(b) a power source operatively connected to at least one of said first, second and third panel to enable at least one of said first, second or third panel to extend to a second operating position whereby said leading edge of the at least one extended panel extends a greater distance toward an aircraft than at its first operating position.*

*32. A cab for serving as a portal between an aircraft passenger boarding bridge walkway and an aircraft exterior cabin door and for aligning the walkway to the cabin door to permit passengers to board the aircraft from the walkway, comprising:*

*(a) a frame having a floor to form a passageway open at its opposite ends, said passageway sized to permit a person to pass there through; said floor comprising a first, second and third panel each having a leading edge positionable toward the aircraft, and each leading edge having a first operating position, said second panel being positioned intermediate said first and third panels; and*

*(b) a power source operatively connected to at least one of said first, second and third panel to enable each connected panel to be retracted to a second operating position whereby said leading edge of each of the retracted panels extends a lesser distance toward the aircraft than at said first operating position, said power source further operatively connected to at least one of said panels to extend to a third operating position whereby said leading edge of said extended panel extends a greater distance toward an aircraft than at said first operating position.*

*33. A cab for serving as a portal between an aircraft passenger boarding bridge walkway and an aircraft exterior cabin door and for aligning the walkway to the cabin door to permit passengers to board the aircraft from the walkway, comprising:*

*(a) a frame having a floor to form a passageway open at its opposite ends, said passageway sized to permit a person to pass there through; said floor comprising a first, second and third panel each having a leading edge positionable toward the aircraft, and each leading edge having a first operating position, said second panel being positioned intermediate said first and third panels; and*

*(b) a power source operatively connected to at least one of said first, second and third panel to enable the connected panels to separately or together be retracted to a second operating position whereby said leading edge of each of the retracted panels extends a lesser*

*distance toward the aircraft than at said first operating position, said power source further operatively connected to at least one of said first, second third panel to enable at least one of said panels to extend to a third operating position whereby said leading edge of said extended panel extends a greater distance toward an aircraft than at said first operating position.*

*34. A cab for serving as a portal between an aircraft passenger boarding bridge walkway and an aircraft exterior cabin door and for aligning the walkway to the cabin door to permit passengers to board the aircraft from the walkway, comprising:*

(*a*) *a frame having a floor to form a passageway open at its opposite ends, said passageway sized to permit a person to pass there through; said floor comprising a first, second and third panel each having a leading edge positionable toward the aircraft in a first operating position, said second panel being positioned intermediate said first and third panels; and*

(*b*) *a power source operatively connected to at least one of said first, second and third panel to enable each connected panel to separately or together to be movable to a second operating position whereby said leading edge of each of the movable panels extends either a lesser distance toward the aircraft than at said first operating position, or extends a greater distance toward an aircraft than at said first operating position.*

* * * * *